United States Patent [19]

Rosch

[11] 4,093,033
[45] June 6, 1978

[54] SNOWMOBILE SUSPENSION SYSTEM

[75] Inventor: Hubert J. Rosch, Plymouth, Minn.

[73] Assignee: Kawasaki Motors Corp., U.S.A., Santa Ana, Calif.

[21] Appl. No.: 771,800

[22] Filed: Feb. 24, 1977

[51] Int. Cl.² .................................................. B62M 27/02
[52] U.S. Cl. .................................................. 180/5 R
[58] Field of Search .................................. 180/5 R

[56] References Cited

U.S. PATENT DOCUMENTS

| | | | |
|---|---|---|---|
| 3,613,811 | 10/1971 | Brandi et al. | 180/5 R |
| 3,822,755 | 7/1974 | Hine | 180/5 R |
| 3,854,541 | 12/1974 | Hollnagel | 180/5 R |
| 3,885,641 | 5/1975 | Harris | 180/5 R |

Primary Examiner—Richard A. Bertsch
Attorney, Agent, or Firm—Poms, Smith, Lande & Glenny

[57] ABSTRACT

A suspension system for a track driven vehicle such as a snowmobile, comprising a generally rectangular rigid suspension frame having longitudinal rails slidably supported on the inner surface of the track, and front and rear suspension assemblies for resiliently supporting the vehicle body. The front support assembly includes a weldment pivotally attached at its rear end to the frame, its front end being resiliently biased upwardly to support the body. The rear suspension assembly includes a transverse shaft carried by the body and a centrally disposed longitudinal compression spring for resiliently biasing the shaft upwardly relative to the suspension frame through a linkage effectively providing an increasing spring rate as the parts approach maximum excursion. The linkage includes pivotal components whose pivotal axes form a triangle which flattens as the body is displaced downwardly, and the change of altitude of the triangle is vectorially added to the component of the frame movement compressing the spring. The rate of that change increases rapidly as the parts approach maximum excursion.

8 Claims, 5 Drawing Figures

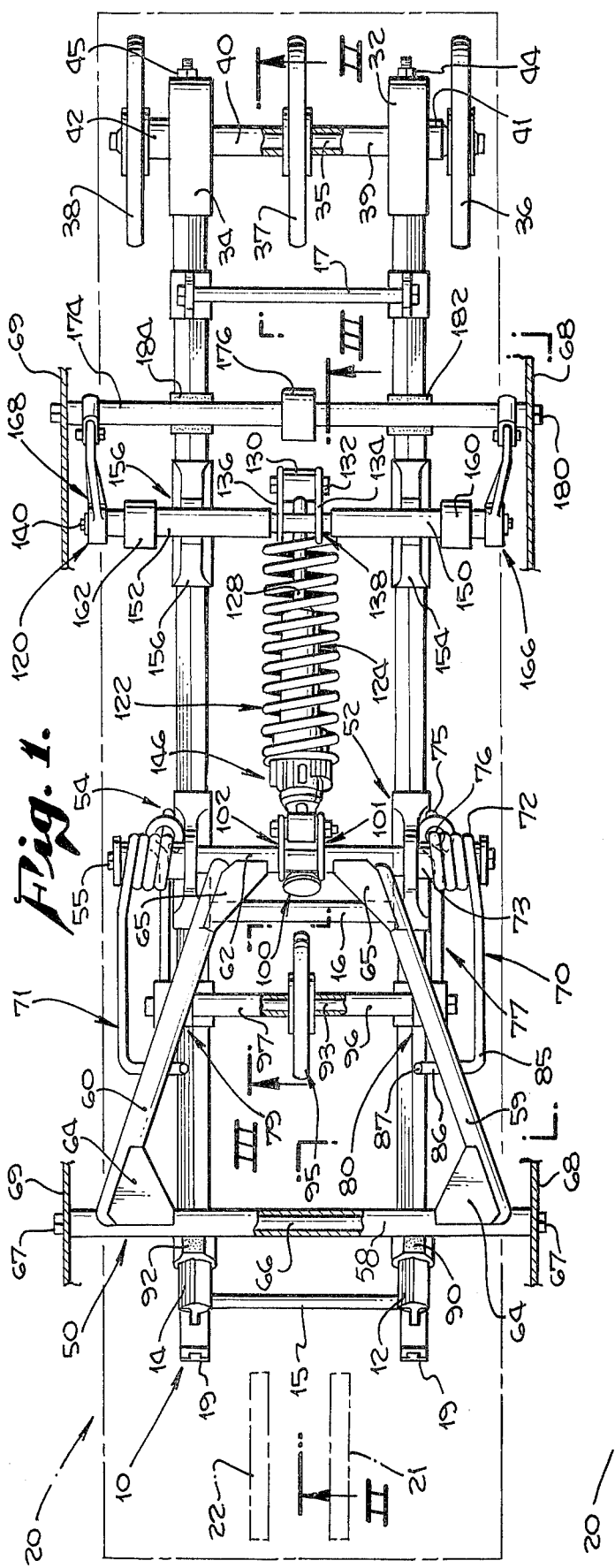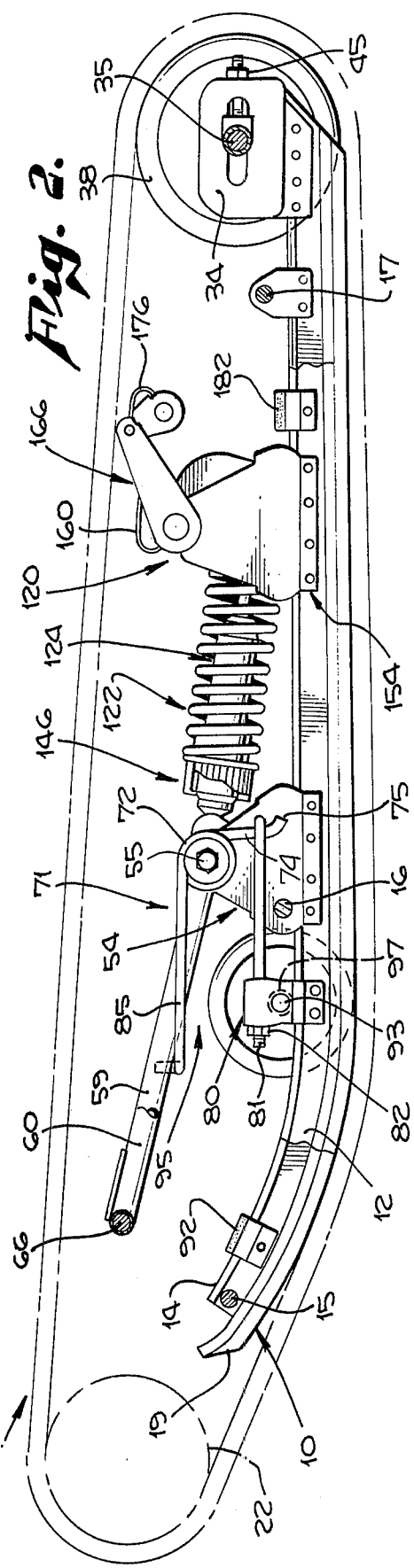

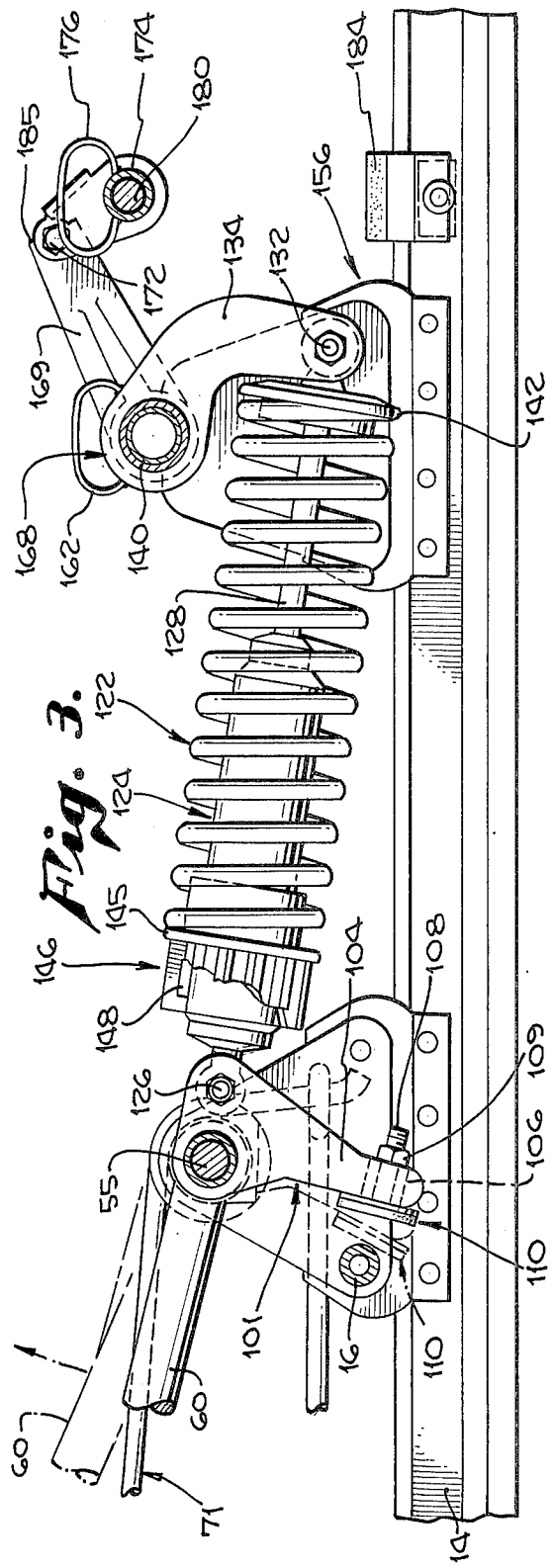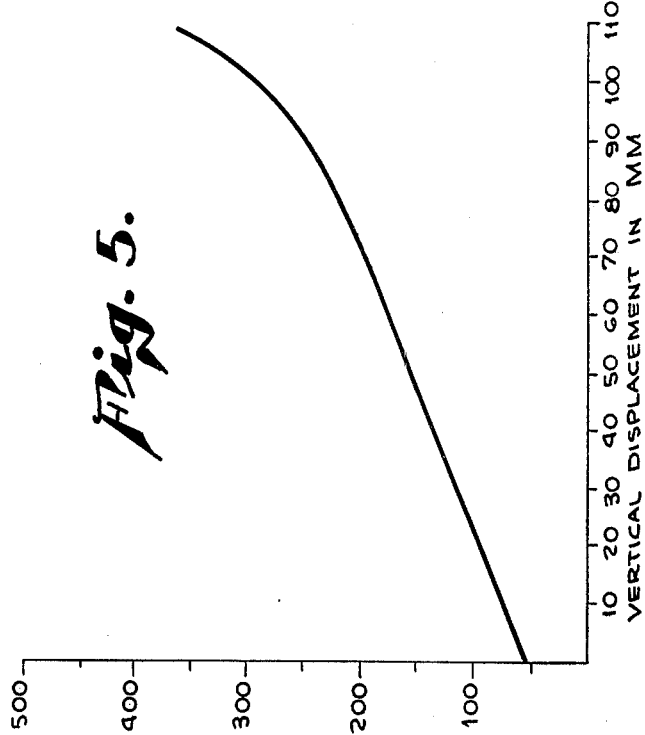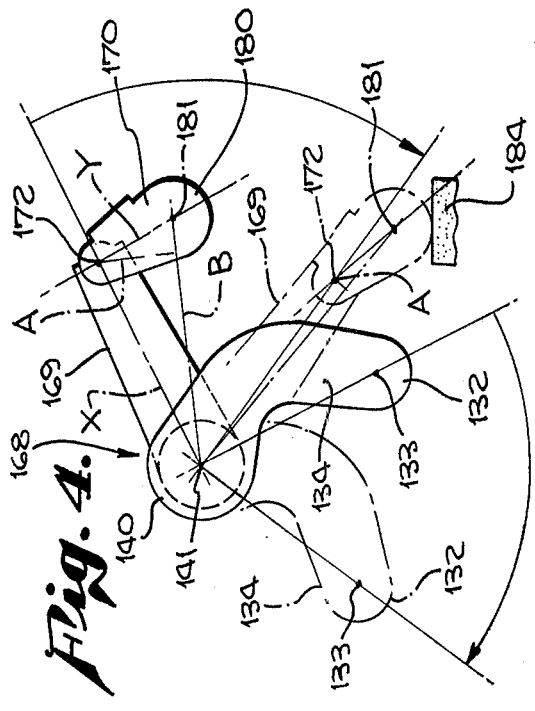

SNOWMOBILE SUSPENSION SYSTEM

BACKGROUND AND SUMMARY OF THE INVENTION

The present invention relates generally to vehicle suspension systems, and more particularly to such a system advantageously used in track driven vehicles such as snowmobiles.

In accordance with a preferred form of the invention hereinafter illustrated and described in detail, the suspension system includes a generally rectangular rigid frame having a pair of spaced parallel beams fixed by transverse braces and extending longitudinally of the vehicle, each beam terminating downwardly in a skid or runner slidably contacting and supported by the inner surface of the vehicle track. Attached to the frame are front and rear assemblies for resiliently supporting the vehicle body by front and rear transverse rods mounted on the body. The front support assembly includes a pair of laterally spaced arms pivotally attached at their rear ends to a transverse brace carried by the frame and resiliently biased upwardly relative to the frame, their forward ends being attached to the body, desirably through a transverse rod pivotally attached to the body. Means are provided for adjusting the biasing force urging the forward ends upwardly so that the user can select the desired ride and related handling characteristics of the vehicle.

The rear support assembly of the system includes a transverse rod carried by the body and resilient means in the form of a centrally disposed compression spring carried by the frame for resiliently biasing the rod upwardly relative to the frame through a linkage providing progressive springing action whereby to afford a soft cushiony ride over minor ground irregularities, while providing stiffer springing when the vehicle passes over large bumps or hummocks at increased speed. The rear support assembly also desirably includes a shock absorber acting in conjunction with the compression spring as well as means adjustable by the user for selecting the normal compression imposed on the spring, so that users having body weights within a wide range — say 65 to 115 kg — can, by proper setting of the adjustable means, enjoy substantially the same riding comfort on the vehicle. The linkage translating vertical frame movement into compression of the spring includes pivotal components whose pivotal axes form a triangle which flattens as the body is displaced downwardly, and the change of altitude of the triangle is vectorially added to the component of frame movement compressing the spring. The rate of altitude change increases rapidly as the parts approach maximum excursion, thus providing the progressively stiffening spring action.

It is accordingly a principal object of the invention to provide a novel suspension system for a track driven vehicle such as a snowmobile. Other objects and purposes are to provide, in such a system, front and rear support assemblies each including selectively adjustable means by which the user can choose desired riding and handling characteristics of the vehicle; to provide a rear support assembly including a resilient member and novel linkage means for translating movement of the resilient member into progressive springing action for enabling the rear assembly to provide safe and comfortable riding qualities over a wide range of severity of vertical track displacement resulting from ground irregularities; to provide such a system which is compact in size and light in weight, and accordingly well suited for a one- or two-occupant vehicle; and for additional objects and purposes as will be understood from the following description of a preferred embodiment of the invention, taken in conjunction with the attached drawings.

BRIEF DESCRIPTION OF THE DRAWINGS

FIG. 1 is a top plan view of a suspension system in accordance with the present invention.

FIG. 2 is a longitudinal sectional view taken on the broken line II—II of FIG. 1.

FIG. 3 is a fragmentary view on an enlarged scale taken on the broken line III—III of FIG. 1, the front suspension assembly being shown in solid lines in its normal position, and in dotted outline in its position of maximum upward excursion.

FIG. 4 is a diagrammatic view of the linkage of the rear suspension assembly, showing in solid lines the parts in their normal position, and in dotted lines the parts in their position of maximum excursion.

FIG. 5 is a curve of upward restorative force which the rear suspension assembly exerts on the vehicle body, plotted against excursion or displacement from normal position.

DETAILED DESCRIPTION

Referring now in detail to the drawings, and first to FIGS. 1 and 2 thereof, the suspension assembly of the present invention includes a lower generally rectangular frame indicated generally at 10 and comprising in the present illustrative form of the invention a pair of longitudinally extending side rails or beams 12 and 14, joined in fixed assembled relation by a set of transversely extending cross braces or struts, including front, central and rear struts 15, 16 and 17 respectively. In accordance with conventional snowmobile design, each of the longitudinal side rails has fixed to its lower portion a skid strip 19 for slidably contacting and being supported on a smooth inner surface of the drive track, as is conventional in the snowmobile art. The drive track of the present invention is schematically indicated generally at 20, and is trained over conventional drive sprockets also schematically indicated at 21 and 22, the details of the power train not being shown, since such details form no part of the present invention, and are well known in the art.

At the rear end of the frame, in conventional manner, there are provided means for supporting a set of idler wheels around which endless track 20 is trained. More specifically, the rear ends of rails 12 and 14 have fixed thereto a pair of upstanding brackets 32 and 34 respectively, which support transverse rear axle 35, on which are rotatably journaled idler wheels 36, 37 and 38. Spacer sleeves 39 and 40 are concentrically carried on axle 35 for positioning central idler wheel 37 midway between brackets 32 and 34, and the outer idler wheels 36 and 38 are similarly positioned laterally by spacers 41 and 42. Brackets 32 and 34 are desirably provided with conventional means 44 and 45 respectively for selectively adjusting the fore and aft position of shaft 35, whereby to impose desired tension on track 20.

As previously mentioned in general terms, the suspension system of the present invention includes front and rear support assemblies for resiliently carrying the weight of the vehicle body on frame 10 just described. With continued reference to FIGS. 1 and 2, the front support assembly is indicated generally at 50 and is pivotally supported at its rear end on frame 10. More specifically, side rails 12 and 14 have mounted thereto a pair of upstanding brackets respectively indicated generally at 52 and 54, whose upper portions support a transverse shaft 55, which extends transversely beyond the support brackets 52 and 54 for reasons described below.

As best seen in FIG. 1, front support assembly 50 is here shown as comprising a weldment made up of a transversely extending rigid sleeve 58 having fixed thereto a pair of symmetrically disposed rearwardly converging arms 59 and 60 fixedly attached at their rear ends to a sleeve 62 rotatably carried on shaft 55 and extending between brackets 52 and 54. The weldment is desirably strengthened by a pair of front gussets 64, and a pair of rear gussets 65. Front sleeve 58 of the weldment is concentrically mounted upon a transverse shaft 66 whose outermost ends are fixedly attached to structural members of the vehicle body. Thus, the ends of the shaft 66 may be attached by fastening bolts 67 to the downwardly depending side walls 68 and 69, fragmentarily shown, of the conventional inverted U-shaped tunnel of this kind of vehicle.

Front support assembly 50 includes means for resiliently biasing upwardly the weldment including transverse sleeve 58, arms 59 and 60 and sleeve 62 about the axis of shaft 55. In the present illustrative form of the invention, such resilient means include a pair of symmetrically disposed springs indicated generally at 70 and 71. Spring 70 and its mounting will be described in detail, it being understood that spring 71 and its mounting are symmetrically disposed mirror images of the corresponding parts of spring 70. Thus spring 70 includes a central helical section 72 carried by and surrounding a spacer sleeve 73, rotatably carried concentrically on the portion of shaft 55 which extends outwardly of bracket 52. Coil 72 terminates at one end in an anchor leg 74 having a rearwardly directed tip 75, leg 74 passing through the opening 76 of an eye-bolt indicated generally at 77. The eye-bolt shank extends forwardly through a horizontal bore formed in a bracket indicated generally at 80, fixed to rail 12 and extending upwardly therefrom, and the forward end 81 of the shank is in threaded engagement with a nut 82, constituting means for selectively adjusting the resilient force of spring 70 urging the front suspension assembly upwardly.

The other end of spring coil 72 includes a torsion arm 85 projecting substantially forwardly of the coil and terminating forwardly in an inwardly turned horizontal portion 86 having an upwardly turned tip 87. The horizontal portion 86 underlies arm 59 of the weldment, serving to urge the arm upwardly so that, in conjunction with the corresponding part of the opposite spring 71, the forward sleeve 58 of the weldment is urged upwardly by a force selectively adjustable by the user, as previously mentioned.

Buffer means are provided to avoid metal-to-metal contact between the distal sleeve 58 and the rails, here shown as including a pair of resilient pillows 90 and 92 mounted upon and extending upwardly from the side rails 12 and 14.

Bracket 80 previously mentioned and its corresponding bracket 79 mounted upon rail 14 serve additionally as support members for a transverse shaft 93 on which is rotatably mounted a centrally disposed front idler wheel indicated generally at 95, maintained in position midway between side rails 12 and 14 by spacer sleeves 96 and 97 rotatably mounted concentrically on shaft 93. Idler wheel 95 is not necessarily in continuous contact with the track during normal operation over flat terrain, but serves to minimize stress and possible damage to the track when and immediately after the front end of the suspension assembly is sujected to a particularly severe jolt during travel.

Means are provided for limiting the upward pivotal movement of the front suspension assembly 50, and for resiliently damping the arrival of the parts at their uppermost position. In the present form of the invention, such means include a bracket assembly indicated generally at 100 fixedly carried by the rear sleeve 62 previously described, and including a pair of laterally spaced bracket plates indicated generally at 101 and 102. As best seen in FIG. 3, bracket plate 101 includes a downwardly extending arm portion 104 which, in cooperation with the corresponding arm of bracket plate 102, carries a central block 106 therebetween at its lower end. Block 106 has a central bore receiving therein a portion of the shank 108 of a bolt having an enlarged resilient head indicated generally at 110, the bolt being held in position by nut 109. It will be seen that, as arm 60 swings clockwise upwardly to its dotted line position shown in FIG. 3, that movement is transmitted through sleeve 62 and bracket assembly 100 to cause resilient head 110 to move to its dotted line position in FIG. 3, abutting brace or strut 16 and thus limiting further clockwise movement of the parts.

The rear suspension assembly will be described in connection with FIGS. 1 – 3, and its mode of operation will be described in connection with the diagrammatic showing of FIG. 4 and the graphical showing of FIG. 5. As seen generally in FIG. 1, the rear suspension assembly is indicated generally at 120, and its major components include a longitudinally extending central compression spring indicated generally at 122, which provides the force tending to restore the parts to their normal relationship when the suspension frame is moved sharply upwardly relative to the vehicle body, as when passing over a hummock or other rise in the terrain. As will be described in detail in connection with FIG. 3, the front end of spring 122 is pivotally attached to a point which is essentially fixed relative to the suspension frame, while the rear end of the spring moves fore and aft as a function of vertical movement of the frame relative to the body, by way of a linkage so arranged that the restorative force of the spring per unit of relative vertical movement increases substantially as the parts approach their position of maximum excursion from their normal positions. A shock absorber functions in conjunction with the spring in conventional manner.

The shock absorber is indicated generally at 124 and is enclosed within the coils of spring 122. The front end of the shock absorber is pivotally attached to the central portion of a bolt 126 which is mounted upon and extends between the bracket plates 101 and 102 of bracket assembly 100. The shock absorber includes a conventional rearwardly extending piston rod 128 which terminates rearwardly in a cylindrical fitting 130 pivotally mounted upon a bolt 132 extending between and supported by a pair of bracket plates 134 and 136 constituting a bracket assembly indicated generally at 138 and fixedly mounted on transverse shaft 140. The rear end of spring 122 bears against a retainer plate 142 which is carried by the piston rod 128 of the shock absorber. The forward end of spring 122 bears against an annular flange 145 of a camming collar indicated generally at 146 rotatably mounted upon the body of shock absorber 124. The shock absorber has mounted near its base a pair of oppositely disposed lugs one of which is seen at 148 in FIG. 3 so that, by rotation of camming collar 146, as by a spanner wrench or the like, the position of flange 145 can be selectively adjusted longitudinally relative to the shock absorber, thereby pretensioning spring 122 as may be desired, primarily based upon the weight of the occupant.

Transverse shaft 140 is rotatably carried concentrically within a pair of laterally extending sleeves 150 and 152, which are fixed to a pair of brackets indicated generally at 154 and 156 respectively, attached to side rails 12 and 14 and extending upwardly therefrom. Sleeves 150 and 152 have fixed to their upper surfaces a pair of skid plates 160 and 162 for slidably contacting smooth inner portions of the return run of the track during bumping conditions.

The outer ends of rotatable shaft 140 have fixed thereto a pair of symmetrically disposed pivot arm assemblies indicated generally at 166 and 168. Pivot arm assembly 168 will be described in detail in connection with FIG. 3, it being understood that this assembly and the linkage connected thereto is the mirror image of assembly 166 and the linkage connected to it. Pivot arm assembly 168 includes a rearwardly extending pivot arm 169 having pivotally connected thereto a link 170 about a pivotal axis 172. The distal end of link 170 is connected to a sleeve 174 extending transversely of the vehicle and carrying in its central portion a skid plate 176, serving the same purpose as skid plates 160 and 162 previously mentioned. Concentrically within sleeve 174 is mounted a transverse shaft 180 whose outermost ends are connected to sidewalls 68 and 69 of the tunnel, and thus support the rear portion of the vehicle. As will be understood, transverse shaft 180 moves upwardly and downwardly relative to the suspension frame as the vehicle moves over irregular terrain, and means are provided for resiliently limiting the downward movement of shaft 180 and sleeve 174, here in the form of a pair of resilient bumpers 182 and 184 mounted respectively on side rails 12 and 14. Downward abutment of sleeve 174 on bumpers 182 and 184 prevents the pivotal axis 172 from moving over center. It may be noted that when the suspension system is in a weightless condition, as when the vehicle is momentarily airborne, pivotal axis 172 would have a tendency to move over center, making the suspension inoperative. This possibility is prevented by positive stop means limiting pivotal movement, such stop means here including shoulders 185 and 186 which are formed on arm 169 and link 170 respectively, and which abut before the longitudinal axes of arm 169 and link 170 can become collinear.

FIG. 4 diagrammatically illustrates the major components of the linkage assembly, shown in solid lines in their normal or rest positions, and in dotted outline in their positions of maximum excursion, corresponding to maximum compressive force or strain exerted on spring 122. The axis of shaft 140 is indicated at 141, the axis of shaft 180 is indicated at 181, and the axis of bolt 132 is indicated at 133. Axes 141, 172 and 181 lie at the vertices of a triangle two of whose sides are indicated at X and Y, and whose altitude and base are indicated at A and B respectively. Thus B forms the third side of triangle XYB. Keeping in mind that the excursion or displacement of axis 181 is essentially vertical, and that axis 181 lies somewhat above axis 141, it will be seen that the shape of triangle XYB, and hence the length of altitude A, remain virtually unchanged during the initial portion of the downward displacement of axis 181. It will also be noted that the angular movement of arms 134 and 169, which are fixed to one another, and hence the strain imposed on spring 122, are a function of the downward displacement. It will also be seen that, as displacement continues downwardly after the initial portion during which altitude A remains virtually constant, that altitude will decrease in value at an increasing rate until it attains its minimum value shown in the dotted outline positions of arm 169 and link 170 in FIG. 4, corresponding to bottoming of sleeve 174 on bumper 184. The diminishing value of altitude A, i.e. the flattening of triangle XYB, creates a rapid increase in the tension of the linkage including arm 169 and link 170. This increased tension, while well within material stress limitations, adds to the effective rate of spring 122 in a smooth, progressive manner as shown in FIG. 5.

The curve of FIG. 5 is plotted from data corresponding to a physical embodiment of the present invention. It will be noted that the curve is a straight line relationship for the first 80 mm of displacement, and that it rises rapidly for greater displacement. Thus the linkage of the present invention, used with a conventional helical spring having a constant spring rate, provides the desirable advantages of a progressively stiffer spring rate as the parts approach maximum displacement.

In a preferred embodiment of the invention, pivot arm 169 may have a length of 10 cm, link 170 a length of 4 cm, and arm 134 a length of 9 cm, each length being measured between opposite pivotal axes of the respective element. Link 170, in addition to serving as a component of linkage 168 in the manner just described, also accommodates the small longitudinal travel of the vehicle body relative to the suspension frame resulting from the arcuate movement of the weldment of the front suspension assembly. Such longitudinal travel is typically of the order of 1 or 2 cm, and link 170 is accordingly short relative to the length of arm 169. Arm 134, as already mentioned, is approximately the same length as arm 169, and the arms are angularly spaced from one another by approximately 90°. As a result, vertical displacement of the vehicle body relative to the frame, translated by the linkage as above described, causes substantially horizontal movement of the rear end of spring 122.

Modifications and changes from the exemplary form of the invention hereinabove described and illustrated are within the contemplation of the invention, and are intended to be embraced within the scope of the appended claims.

I claim:

1. In a suspension system for the body of a track driven vehicle having a suspension frame slidably supported on a ground-engaging track and a suspension assembly mounted on the frame for yieldably supporting one end of the body, the provision of a suspension assembly for the other body end comprising:

a longitudinally resilient member having one end connected to said frame, the other end being normally located at a rest point and movable to a limit point against restorative force produced in the member;

and linkage means connected between said rest point and said other body end for translating downward displacement of said other body end relative to the frame into longitudinal movement of said rest point toward said limit point, including means for increasing the ratio of said movement relative to said displacement as the other end of the resilient member approaches the limit point.

2. The invention as defined in claim 1 wherein said resilient member constitutes a longitudinally compressible spring having a constant spring rate.

3. The invention as defined in claim 2 including selectively adjustable means for imposing on the spring a desired compressive stress when the parts are in their rest positions.

4. The invention as defined in claim 1 wherein said first named suspension assembly is associated with the front end of the vehicle, and includes means creating longitudinal travel of the body relative to the frame during vertical displacement of the body.

5. The invention as defined in claim 4 wherein said linkage means includes a member for accommodating said longitudinal travel.

6. The invention as defined in claim 1 wherein the linkage means includes a pair of laterally spaced link assemblies, each assembly comprising first and second arms in fixed angular relation with one another for pivotal rotation about a common axis, the distal end of the first arm being connected to said rest point, and the distal end of the other arm having pivotally attached thereto a link whose other end is pivotally attached to said other body end.

7. The invention as defined in claim 6 wherein said common axis extends transversely of the vehicle.

8. The invention as defined in claim 6 wherein said arms are substantially equal in length.

* * * * *